(12) United States Patent
Yu et al.

(10) Patent No.: US 7,628,077 B2
(45) Date of Patent: Dec. 8, 2009

(54) EXCITATION TEST METHOD AND APPARATUS FOR VEHICLE

(75) Inventors: Jinghong Yu, Dublin, OH (US); Brian Brickner, Beavercreek, OH (US); Brian Nutwell, Dublin, OH (US); Charles Edward Hildreth, Marion, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/768,950

(22) Filed: Jun. 27, 2007

(65) Prior Publication Data

US 2009/0000385 A1 Jan. 1, 2009

(51) Int. Cl.
*G01M 17/00* (2006.01)
*G01M 7/00* (2006.01)

(52) U.S. Cl. .......................... 73/669; 73/147
(58) Field of Classification Search .................. 73/669, 73/662, 663, 146–147, 11.08
See application file for complete search history.

(56) References Cited

U.S. PATENT DOCUMENTS

| | | | | |
|---|---|---|---|---|
| 3,718,033 | A | | 2/1973 | Petersen |
| 3,855,841 | A | * | 12/1974 | Hunter ........................ 73/11.08 |
| 4,527,416 | A | * | 7/1985 | Haeg et al. .................. 73/11.08 |
| 4,658,656 | A | * | 4/1987 | Haeg ............................ 73/669 |
| 4,798,088 | A | * | 1/1989 | Haeg et al. ..................... 73/669 |
| 4,843,873 | A | * | 7/1989 | Harald et al. .................. 73/147 |
| 4,951,504 | A | | 8/1990 | Klock et al. |
| 4,989,455 | A | * | 2/1991 | Gomyo et al. ................. 73/669 |
| 5,533,403 | A | | 7/1996 | Haeg et al. |
| 5,560,589 | A | * | 10/1996 | Gran et al. ...................... 267/3 |
| 5,942,673 | A | | 8/1999 | Horiuchi et al. |
| 6,213,253 | B1 | | 4/2001 | Paul et al. |
| 7,032,720 | B2 | * | 4/2006 | Jette et al. ...................... 188/36 |
| 7,058,488 | B2 | * | 6/2006 | Kemp et al. .................... 701/33 |
| 7,100,434 | B2 | | 9/2006 | Gu et al. |

FOREIGN PATENT DOCUMENTS

| | | |
|---|---|---|
| DE | 19937124 | 2/2001 |
| JP | 9026383 | 1/1997 |
| JP | 2001165820 | 6/2001 |

\* cited by examiner

*Primary Examiner*—Helen C. Kwok
(74) *Attorney, Agent, or Firm*—Cermak Kenealy Vaidya & Nakajima LLP; Mark E. Duell

(57) ABSTRACT

A vehicle excitation testing system and method can include a device for simulating a vehicular motion and vehicular vibration and then measuring response. The system is designed to test front and/or rear wheel sections of a vehicle. The testing system can include a vehicle suspension system including a wheel and chassis, an excitation actuator connected to the suspension system, and a dummy or a real vehicle body linked to the suspension system and having a frame. The frame can be positively attached to the ground surface or floor or other similar isolated and stable base surface. Measuring devices can be connected to the frame, suspension and/or wheels. When the vehicle is excited to simulate road and other conditions, the wheels, suspension system and the vehicle body vibrate. Measurement of these transmitted vibrations can be studied in order to determine how to best control unwanted or unnecessary vibrations in the vehicle.

18 Claims, 4 Drawing Sheets ized by *c*h...

EXCITATION TEST METHOD AND APPARATUS FOR VEHICLE

BACKGROUND OF THE INVENTION

1. Field

The disclosed subject matter relates to a method and apparatus for testing a vehicle for various structural noise and vibration transmission. More specifically, the disclosed subject matter relates to a method and apparatus for testing or monitoring wheel vibration through the use of a force/vibration input and unique attachment/damping structures for the vehicle to be tested. Even more specifically, the disclosed subject matter is directed to an excitation test method for reproducing vehicle chassis and steering wheel vibrations induced by brake torque fluctuation and/or tire mass imbalance.

2. Brief Description of the Related Art

A vehicle's suspension system affects both riding comfort and general performance in a vehicle. The suspension system is typically tested during the development the vehicle. Conventionally, a vehicle suspension system has been tested either by driving the vehicle on a road or by using an actuator. The latter can be carried out by placing the wheel(s) of a vehicle on an exciting unit and exciting the body by using an actuator to simulate road conditions. The body is supported by the wheels and the performance of the suspension system is evaluated by measuring the body motion. For example, a vibration input having a waveform such as obtained by an actual vehicle can be reproduced by an actuator and applied to the wheels of the vehicle. Measurement of vibration and movement at the vehicle's wheels, body and/or suspension can then be analyzed and compared to the input to determine vehicle characteristics.

Another vehicle excitation testing system includes using a so-called active suspension testing system in which rollers are driven by an actuator so as to simulate irregularities of a road in a chassis dynamometer for driving an actual vehicle on a bench of the rotating rollers.

FIG. 4 shows a conventional example of a vehicle testing system in which a dummy vehicle is outfitted with second actuators 904 fixed to a rigid wall 903 and reaction measuring devices 906 mounted to a frame 905. Wheels 902 are anchored to one end of a suspension system 901 of the vehicle and are linked to first actuators 907 that are fixed to bases 908. The other end of the suspension system 901 includes springs 971, shafts 972, and a frame 973. The reaction measuring device 906 measures reaction force applied to the dummy vehicle body from the suspension system 901.

The vehicle tests described above can be used only under certain conditions in which several parameters (e.g., body structure, road surface condition, running condition, etc.) are all predetermined. Thus, it has been difficult to apply the results of these experiments to the evaluation of other conditions. In addition, recently developed active suspension systems which introduce a feedback signal to a controller of a suspension, enlarge the scale of the test because the actual vehicle is used in the testing. The same applies also in the case of excitement testing. Since the active suspension system requires information from operating feedback signals, those exciting methods which do not provide such feedback information are unable to deal with these new active suspension systems.

There are mainly three types of excitation test methods. The first type is chassis dynamometer excitation. According to this method, the front wheels of a vehicle are driven by a chassis dynamometer. A vibrational input is realized by providing an off-center mass on the wheel or by providing an unevenly worked brake pad or caliper, etc.

The second method can be described as contact patch excitation. In this method, the front wheels of the vehicle are typically placed on an air bearing and the bearing is connected to a vibrator. The vehicle is excited through the air bearing by use of a vibrator.

In accordance with the third typical method, an angular shaking ramp is provided. The vehicle is placed on the angular shaking ramp with the front wheels located at a specific patch location. The patch location is then excited by a vibrator mechanism.

Vehicle chassis and steering wheel vibrations caused by tire/wheel imbalance is commonly referred to as "steering shimmy" and the vibration caused by braking torque fluctuation is called "brake judder." The transfer path for the steering shimmy and brake judder can include the tires, suspension, steering system, and sometimes body flexibility, etc. Vibration is either strengthened or weakened due to subsystems' resonance (and chassis design) along the transfer path (from the tire(s) to the steering wheel). Thus, an excitation test method typically tries to take into account and analyze all possible subsystems (and chassis components) that might be contributing to the resonance of vibration. However, normal on-road testing for steering shimmy and brake judder is not repeatable and is not stable. This is due to road surface variations, phasing of tires, environmental conditions, etc. The typical on-road test is also time consuming and non-repeatable.

Accordingly, there has been a long sought need for a vehicle testing method and apparatus which allows performance testing of the suspension and chassis systems to be carried out accurately, at low cost, and with simple operation. The testing apparatus and method should be compatible with both static and active vehicles suspension systems, and provide repeatable vibration data. Measurement results can be used for many purposes including, but not limited to, mechanism investigation, analysis of chassis vibration characteristics, factor analysis, countermeasure confirmation, etc.

SUMMARY

The disclosed subject matter relates to a method for using a vehicle excitation test apparatus. In accordance with a first aspect of the disclosed subject matter, the method can include: providing a vehicle located adjacent a ground surface, the vehicle including a vehicle frame, at least one vehicle wheel, a longitudinal axis extending along a drive direction of the vehicle, and a vertical axis perpendicular to the longitudinal axis and the ground surface; applying a vertical preload to at least one of the vehicle frame and the at least one vehicle wheel; applying a longitudinal preload to at least one of the vehicle frame and the at least one vehicle wheel; applying a vibrational input to at least one of a first portion of the vehicle frame and the at least one vehicle wheel; rigidly securing a second portion of the vehicle frame to the ground surface such that the second portion of the vehicle frame does not substantially move with respect to the ground surface during the applying of the vibrational input; and measuring reaction to the vibrational input at least one of the vehicle frame and the at least one wheel.

In accordance with another aspect of the disclosed subject matter, the method can include providing the second portion of the vehicle frame in the form of a rear portion of the vehicle frame, and the first portion of the vehicle frame in the form of a front portion of the vehicle frame.

In accordance with another aspect of the disclosed subject matter, the method can include applying the vertical preload and the longitudinal preload to a front wheel of the vehicle.

In accordance with yet another aspect of the disclosed subject matter, the applying of a vibrational input occurs at the front wheel of the vehicle.

In accordance with still another aspect of the disclosed subject matter, the applying of a vibrational input is accomplished through the use of a shaker attached to the at least one vehicle wheel.

In accordance with yet another aspect of the disclosed subject matter, the applying of a vibrational input is accomplished through the use of an air bearing located adjacent the at least one vehicle wheel.

In accordance with another aspect of the disclosed subject matter, a system for conducting excitation tests on a vehicle located adjacent a ground surface can include: a vehicle including a vehicle frame and at least one vehicle wheel, the vehicle including a longitudinal axis extending along a drive direction of the vehicle and a vertical axis perpendicular to the longitudinal axis and the ground surface; a longitudinal preload structure configured to apply a longitudinal preload to at least one of the vehicle frame and the at least one vehicle wheel; a shaker attached to at least one of a first portion of the vehicle frame and the at least one vehicle wheel; an attachment structure rigidly securing a second portion of the vehicle frame to the ground surface such that the second portion of the vehicle frame does not move with respect to the ground surface during operation of the shaker; and a measuring device located adjacent the vehicle and configured to measure vibration at least one of the vehicle frame and the at least one wheel.

In accordance with another aspect of the disclosed subject matter, the second portion of the vehicle frame is a rear portion of the vehicle frame, and the first portion of the vehicle frame is a front portion of the vehicle frame.

In accordance with still another aspect of the disclosed subject matter, the longitudinal preload is connected to a front wheel of the vehicle.

In accordance with yet another aspect of the disclosed subject matter, the shaker is connected to the front wheel of the vehicle.

In accordance with another aspect of the disclosed subject matter, the shaker includes an air bearing.

In accordance with yet another aspect of the disclosed subject matter, the air bearing is located adjacent the at least one vehicle wheel.

In accordance with another aspect of the disclosed subject matter, the attachment structure includes a bar with a first fixing structure located at one end of the bar and a second fixing structure located at an other end of the bar, and the first fixing structure is attached to the vehicle frame, and the second fixing structure is attached to the ground surface.

In accordance with still another aspect of the disclosed subject matter, the system includes a vertical preload structure configured to apply a force to at least one of the vehicle frame and the at least one vehicle wheel.

In accordance with another aspect of the disclosed subject matter, the vertical preload is connected to a front wheel of the vehicle.

In accordance with yet another aspect of the disclosed subject matter, the shaker includes an electronic or hydraulic vibrator.

In accordance with still another aspect of the disclosed subject matter, the attachment structure includes a cement wall.

BRIEF DESCRIPTION OF THE DRAWINGS

The disclosed subject matter will now be described in more detail with reference to exemplary embodiments of the method and apparatus, given only by way of example, and with reference to the accompanying drawings, in which.

DETAILED DESCRIPTION OF EXEMPLARY EMBODIMENTS

Figure 1:
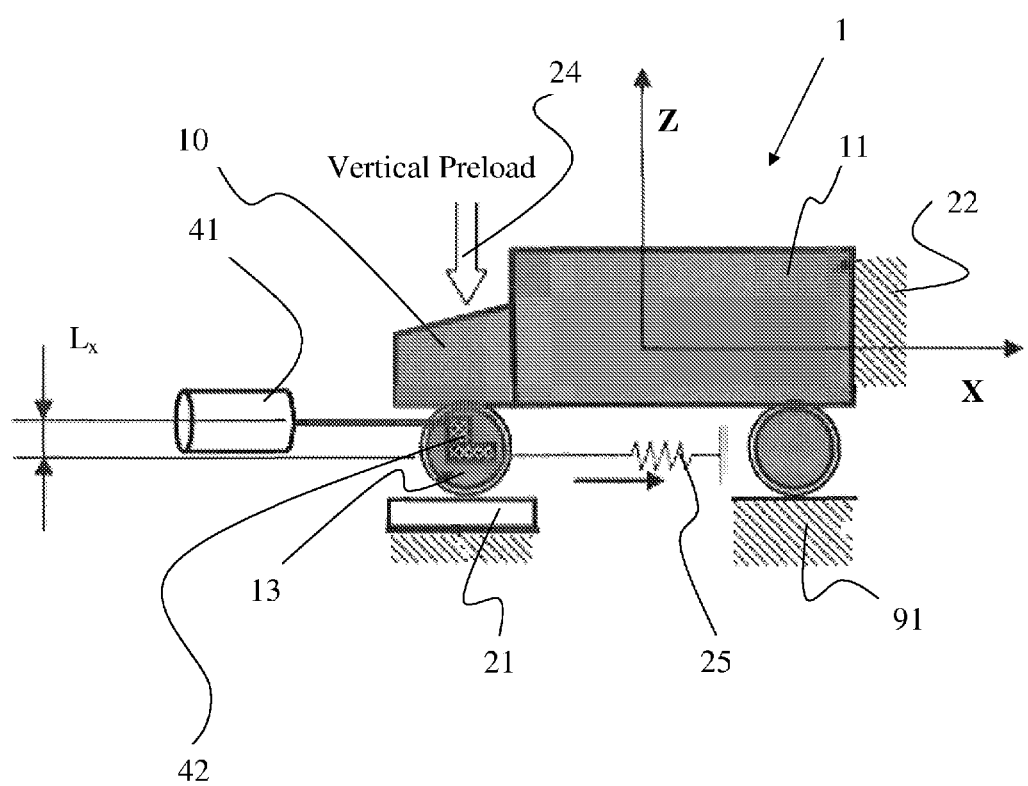
FIG. 1 is a side schematic view of an exemplary embodiment of a system for measuring vehicle vibration made in accordance with principles of the disclosed subject matter.
Figure 2:
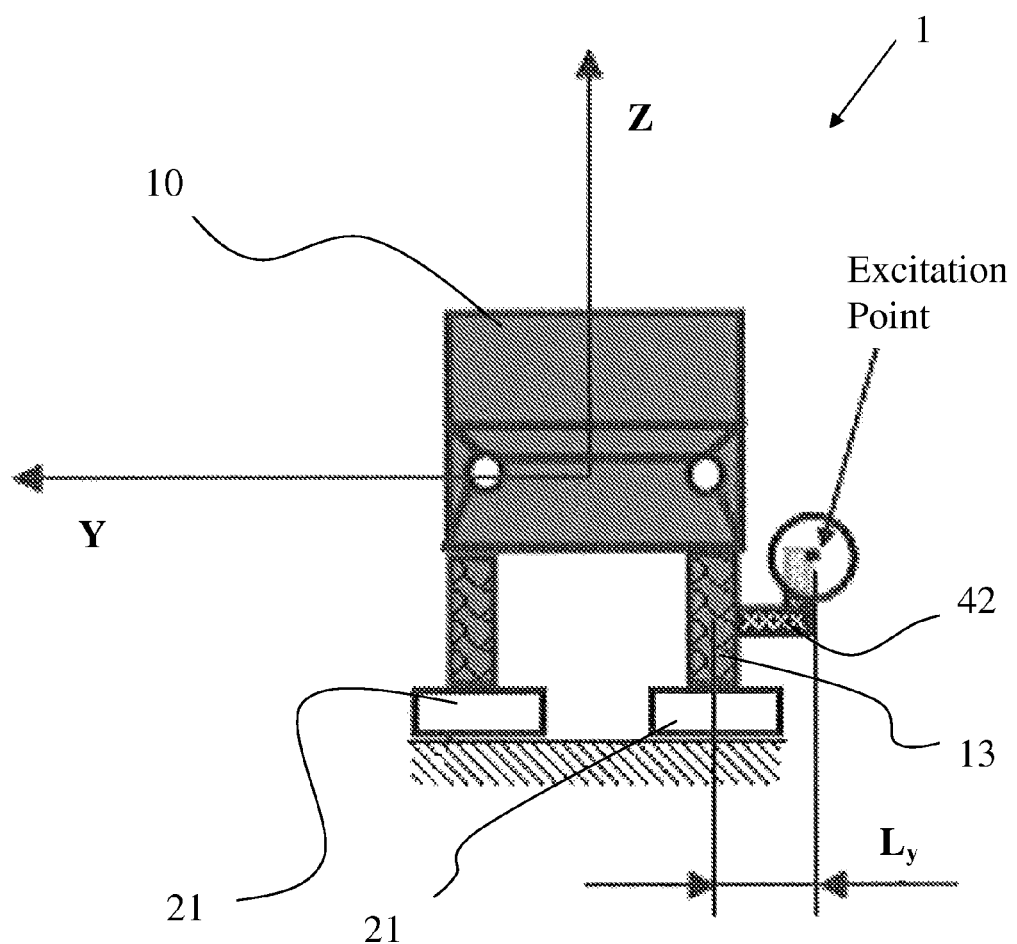
FIG. 2 is a front schematic view of the exemplary embodiment of a system for measuring vehicle vibration of FIG. 1.
Figure 3:
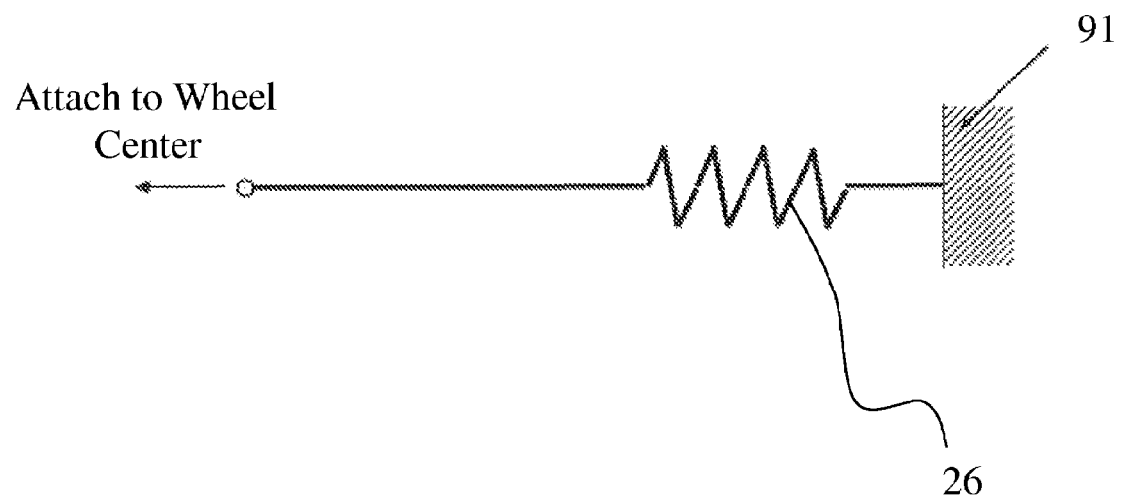
FIG. 3 is a schematic view of an exemplary embodiment of a soft spring load device made in accordance with principles of the disclosed subject matter.
Figure 4:
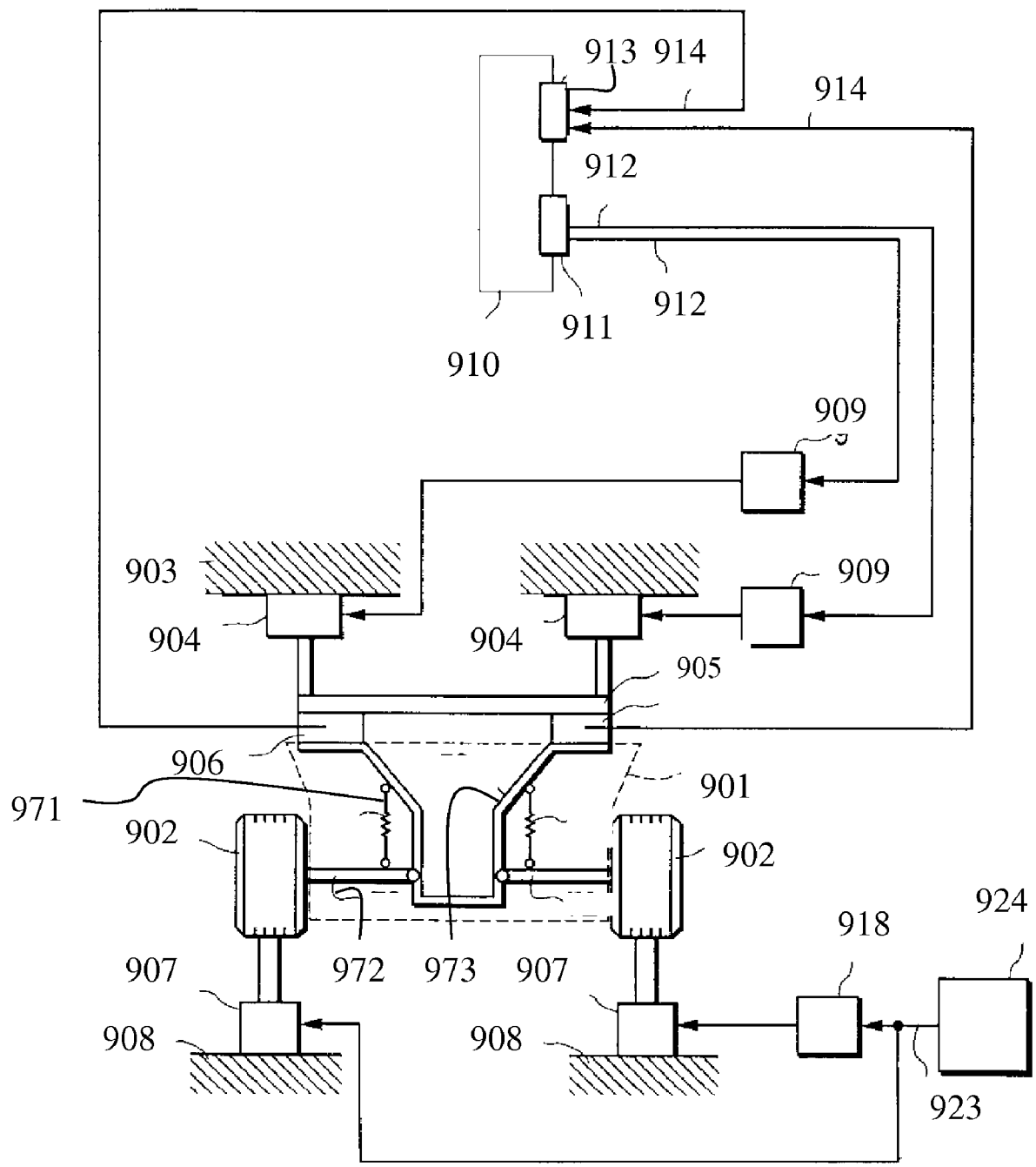
FIG. 4 is a schematic front view of a conventional art vehicle testing system.

As shown in FIG. 1, the excitation test system 1 can include a vehicle 10 that has a vehicle frame 11 rigidly connected to the ground surface 91 via a rigid attachment structure 22. The rigid attachment structure can be a bar that includes fixing structures such as bolts, etc. located at either end for attachment between the frame 11 and the ground surface 91.

A shaker 41 can be configured as an electronic or hydraulic vibrator structure that is attached to a wheel 13 of the vehicle 10 via attachment structure 42. The shaker 41 can be activated to impart a vibrational force to the vehicle via the wheel 13. Alternatively, the shaker can be attached to the frame 11. In addition, or in the alternative, an air bearing 21 can be provided to input the vibrational force to the vehicle 10.

A vertical preload structure 24 can be attached to the vehicle 10 via, for example, the vehicle frame or chassis 11, and can direct a downward force on the vehicle 10. Alternatively, the vehicle preload can be provided simply by the weight of the vehicle itself.

A longitudinal preload structure 25 can be configured to apply a force to the wheel 13 or frame 11 substantially along the longitudinal axis of the vehicle. Both the longitudinal and vertical preload structures 24 and 25 can be configured as springs or pneumatic dampers or other known force application devices.

While particular structures are described above and shown in the drawings, there are many alternative structures that could be used without departing from the spirit and scope of the disclosed subject matter. For example, the shaker 41 can be configured as an electronic or hydraulic vibrator apparatus, but can also be configured as a pneumatically driven vibrator or other known vibration input device. The preload structure 25 can be configured as a spring 26. However, the preload structure 25 can also be configured as an elastic belt, a chain, a rope, or other resilient or semi resilient device that can apply a preload force to the wheel or frame of a vehicle. Furthermore, the rigid attachment structure 22 can be configured as a bar that is attached to a mating structure fixed to the ground surface. In addition, the rigid attachment structure 22 can be configured as an extension of a cement wall or other ground surface that can be directly and rigidly attached to the vehicle's frame.

While the invention has been described in detail with reference to exemplary embodiments thereof, it will be apparent to one skilled in the art that various changes can be made, and equivalents employed, without departing from the scope of the invention. Each of the conventional art documents referenced above is hereby incorporated by reference in its entirety.

What is claimed is:

1. A method for using a vehicle excitation test apparatus, comprising:
   providing a vehicle located adjacent a ground surface, the vehicle including a vehicle frame, at least one vehicle wheel, a longitudinal axis extending along a drive direction of the vehicle, and a vertical axis perpendicular to the longitudinal axis and the ground surface;
   applying a vertical preload to at least one of the vehicle frame and the at least one vehicle wheel;
   applying a longitudinal preload to at least one of the vehicle frame and the at least one vehicle wheel;
   applying a vibrational input to at least one of a first portion of the vehicle frame and the at least one vehicle wheel;
   rigidly securing a second portion of the vehicle frame to the ground surface such that the second portion of the vehicle frame does not substantially move with respect to the ground surface during the applying of the vibrational input; and
   measuring reaction to the vibrational input at at least one of the vehicle frame and the at least one wheel.

2. The method for using a vehicle excitation test apparatus of claim 1, wherein the second portion of the vehicle frame is a rear portion of the vehicle frame, and the first portion of the vehicle frame is a front portion of the vehicle frame.

3. The method for using a vehicle excitation test apparatus of claim 1, wherein applying the vertical preload and applying the longitudinal preload include applying the vertical preload to a front wheel of the vehicle and applying the longitudinal preload to a front wheel of the vehicle.

4. The method for using a vehicle excitation test apparatus of claim 3, wherein the applying of a vibrational input occurs at a front wheel of the vehicle.

5. The method for using a vehicle excitation test apparatus of claim 1, wherein the applying of a vibrational input is accomplished through the use of a shaker attached to the at least one vehicle wheel.

6. The method for using a vehicle excitation test apparatus of claim 1, wherein the applying of a vibrational input is accomplished through the use of an air bearing located adjacent the at least one vehicle wheel.

7. A system for conducting excitation tests on a vehicle located adjacent a ground surface, comprising:
   a vehicle including a vehicle frame and at least one vehicle wheel, the vehicle including a longitudinal axis extending along a drive direction of the vehicle and a vertical axis perpendicular to the longitudinal axis and the ground surface;
   a longitudinal preload structure configured to apply a longitudinal preload to at least one of the vehicle frame and the at least one vehicle wheel;
   a shaker attached to at least one of a first portion of the vehicle frame and the at least one vehicle wheel;
   an attachment structure rigidly securing a second portion of the vehicle frame to the ground surface such that the second portion of the vehicle frame does not substantially move with respect to the ground surface during operation of the shaker; and
   a measuring device located adjacent the vehicle and configured to measure vibration at at least one of the vehicle frame and the at least one wheel.

8. The system for conducting excitation tests on a vehicle of claim 7, wherein the second portion of the vehicle frame is a rear portion of the vehicle frame, and the first portion of the vehicle frame is a front portion of the vehicle frame.

9. The system for conducting excitation tests on a vehicle of claim 7, wherein the longitudinal preload is connected to a front wheel of the vehicle.

10. The system for conducting excitation tests on a vehicle of claim 7, wherein the shaker is connected to a front wheel of the vehicle.

11. The system for conducting excitation tests on a vehicle of claim 7, wherein the shaker includes an air bearing.

12. The system for conducting excitation tests on a vehicle of claim 11, wherein the air bearing is located adjacent the at least one vehicle wheel.

13. The system for conducting excitation tests on a vehicle of claim 7, wherein the shaker is attached to the at least one vehicle wheel.

14. The system for conducting excitation tests on a vehicle of claim 7, wherein the attachment structure includes a bar with a first fixing structure located at a first end of the bar and a second fixing structure located at a second end of the bar, and the first fixing structure is attached to the vehicle frame, and the second fixing structure is attached to the ground surface.

15. The system for conducting excitation tests on a vehicle of claim 7, further comprising:
   a vertical preload structure configured to apply a force to at least one of the vehicle frame and the at least one vehicle wheel.

16. The system for conducting excitation tests on a vehicle of claim 15, wherein the vertical preload is connected to a front wheel of the vehicle.

17. The system for conducting excitation tests on a vehicle of claim 7, wherein the shaker includes an electronic or hydraulic vibrator.

18. The system for conducting excitation tests on a vehicle of claim 7, wherein the attachment structure includes a cement wall.

* * * * *